Figure 1:
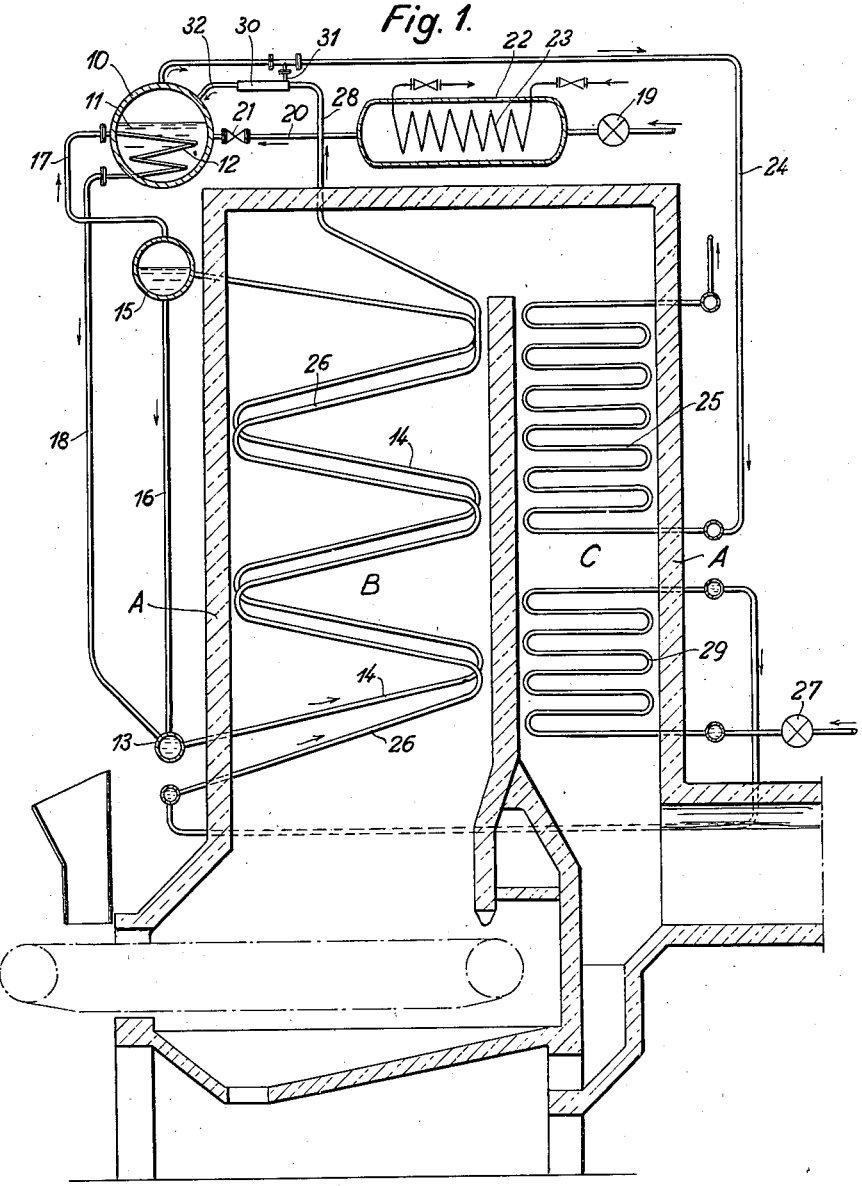

July 28, 1942. G. F. STIEGER 2,291,195
STEAM GENERATOR OF THE HIGH PRESSURE TYPE
Filed Aug. 30, 1939 3 Sheets-Sheet 1

INVENTOR
GEORGE FRIEDRICH STIEGER
BY
ATTORNEYS

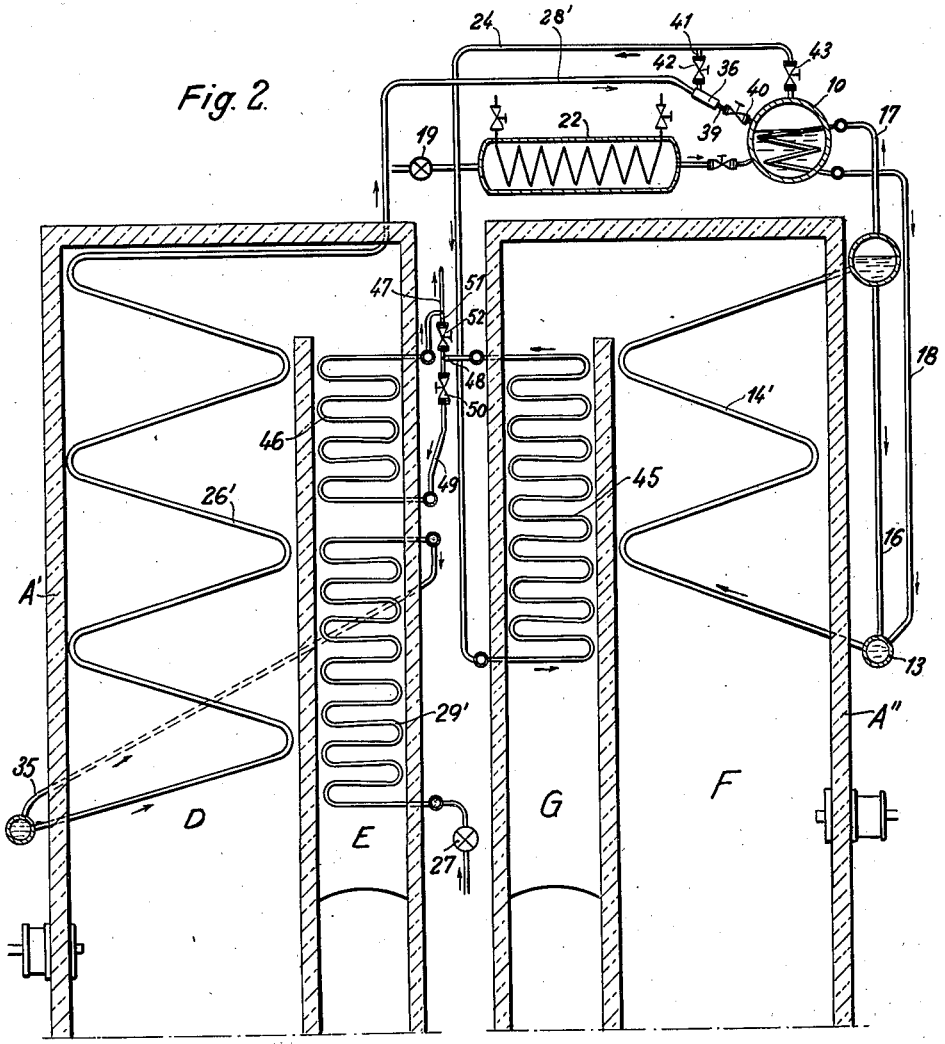

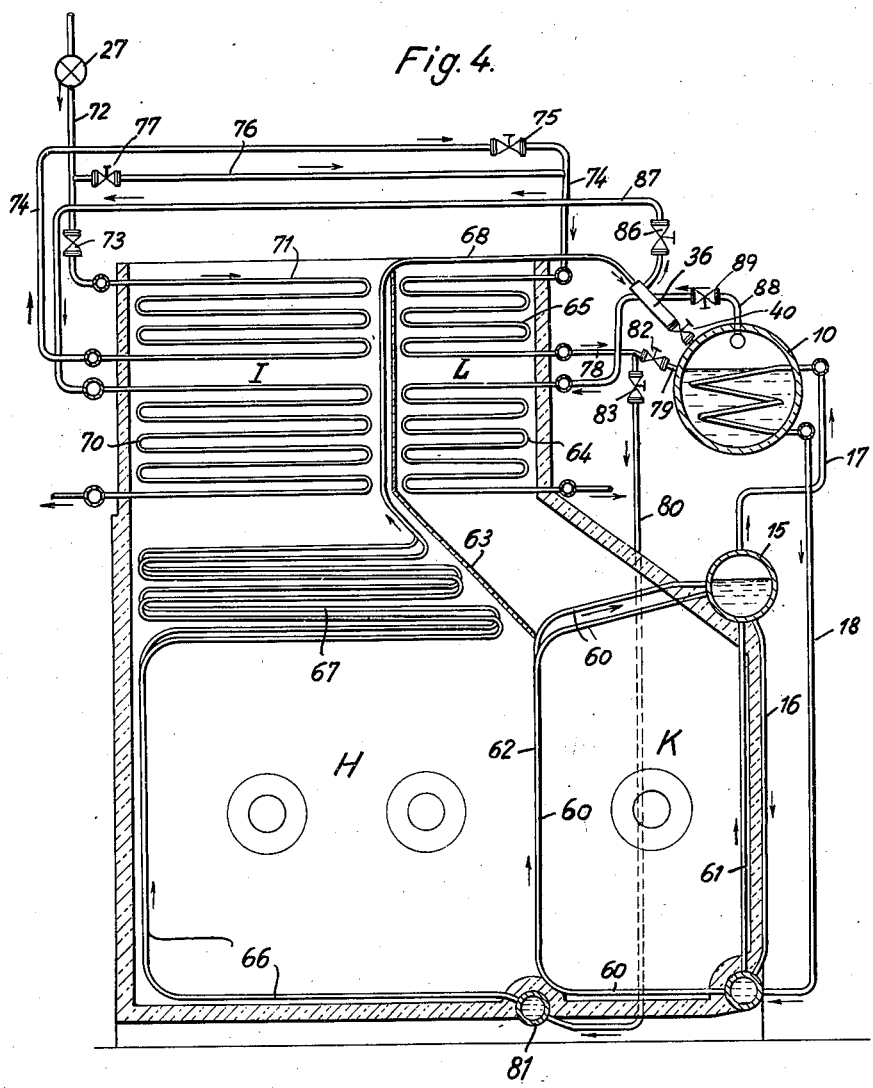

Patented July 28, 1942

2,291,195

UNITED STATES PATENT OFFICE 2,291,195

STEAM GENERATOR OF THE HIGH PRESSURE TYPE

Georg Friedrich Stieger, Kassel-Brasselsberg, Germany

Application August 30, 1939, Serial No. 292,731
In Germany September 6, 1938

7 Claims. (Cl. 122—33)

This invention relates to a novel and improved boiler, particularly of the high pressure type and consists of a boiler for the indirect generation of steam by way of a heating medium circulating in a closed path, in combination with a boiler of the oncethrough type. The advantages of this combination and the novel features of the invention will be apparent from the following description and the annexed drawings in which Figs. 1, 2 and 3 illustrate three preferred embodiments in diagrammatic elevational views, partly in section. Fig. 4 shows in a larger scale a sectional view of a detail.

In Fig. 1 the walls of the boiler are shown at A, which boiler contains the combustion chamber B and the flue C.

The indirectly heated boiler has a water and steam containing tank 10 in which heating elements 12 are arranged which are submerged in the water 11 contained in the said tank. The heating elements 12 are supplied with a heated medium by means of a primary heating system which is provided with a water header from which the water flows through heated tubes 14 into a steam and water containing tank 15, the said tubes 14 being directly heated in the combustion chamber B. From the tank 15 the separated water drops through descending tubes 16 in return to the water header 13. The steam passes through the tube 17 to the heating elements 12 of the tank 10. The steam flowing through the heating elements 12 is condensed by the heat exchange with the water 11 in the tank 10, and this water is fed through the conduit 18 to the water header 13 to continue with its circulation through the primary heating system. Fresh water is supplied to the tank 10 by means of a feed-pump 19 through the conduit 20 which is provided with a valve 21. In the conduit 20 also a preheater for the supplied water is arranged. The preheater may be of any known construction, and the illustrated preheater 22 is heated by steam. The steam flows through a heating coil 23 arranged in the tank 22. From the steam space of the tank 10 a conduit 24 leads to a superheater 25 which is arranged in the flue C.

The said indirectly heated boiler is arranged in combination with a boiler of the once-through type the evaporating tubes 26 of which are arranged in the combustion chamber B.

Fresh water is supplied to the boiler by a feed pump 27. The water passes an economizing coil 29 in the flue C and thence to the tubes 26, thereby entering at the lower ends of the said tubes 26. While passing through the tubes 26 the water is heated up to the boiling temperature. The heating surface of the boiler is arranged in such a way that under all circumstances the water is not completely evaporated, and that the tubes 26 contain a mixture of steam and water at their upper ends 28 protruding beyond the combustion chamber.

The ends 28 of the tubes may be directly connected with the tank 10 in which the steam is separated from the water. The steam flows through the conduit 24 to the superheater, and the water which had not been evaporated in the tubes 26 of the once-through boiler is evaporated in the tank 10 by indirect heat from the heating coils 12. Preferably special unheated steam and water separators 30 are arranged before the tank 10, as shown in Fig. 1. An embodiment of such a separator is shown in Fig. 3. But any other suitable construction may be used.

From the separator 30 the steam flows through a tube connection 31 into the conduit 24. The unevaporated water flows through the tube 32 into the tank 10. This steam separator, by preventing the steam from entering tank 10, relieves the pressure in the tank so that a dryer steam may be generated in tank 10.

By evaporating the remaining water of the once-through boiler in an indirectly heated boiler combined with the said once-through boiler, as set forth, the advantage is obtained that in the indirectly heated boiler not only the mentioned remaining water is evaporated, but that moreover additional steam may be generated. For this purpose the primary heating surface of the indirectly heated boiler is of a capacity greater than that which would be necessary for the evaporation of the said remaining water. For normal load the boiler may be operated in such a way that in the indirectly heated boiler only the remaining water of the once-through boiler is evaporated. The feed-conduit 20 is then either fully obstructed or adjusted for only small quantities of additional feed water. For greater loads of the generator more additional water is fed through the conduit 20.

The tubes 14 of the primary system of the indirectly heated boiler and the tubes 26 of the once-through boiler are arranged in parallel in the heating system. Consequently the effect on both of the boilers is approximately equally changed by changing the heating. With an augmentation of the evaporation in the once-through boiler produced by a higher heating effect also the evaporation of the primary system of the indirectly heated boiler and simultaneously the evaporation in the tank 10 is augmented in approximate proportion and vice-versa.

The combination of the boilers further offers the advantage that the indirectly heated boiler may be used alone for instance in the case that the once-through boiler is damaged or that for smaller load the indirectly heated boiler suffices in view of its better operation. But for such a mode of working with the combined boilers the heating means of the two boilers are preferably separated from each other. Such an embodiment of the invention is illustrated in Fig. 2. The appertaining once-through boiler has the walls A', a combustion chamber D and a flue E, whereas the respective indirectly heated boiler has walls A'', a combustion chamber F and a flue G.

The heated evaporating tubes 14' of the primary system of the indirectly heated boiler are arranged in the combustion chamber F. The other elements of the construction correspond with those of Fig. 1, and therefore similar reference numerals and letters designate like parts. The heated evaporating tubes 26' of the once-through boiler are arranged in the combustion chamber D. The feed pump 27 pumps the fresh water into an economizing coil 29' arranged in the flue E. From the said coil 29' a conduit 35 leads to the tubes 26'. At the ends 28' of the tubes 26' a steam and water separator is arranged. The separator 36 shows in Fig. 3 in a sectional view consists of a cylindrical casing 37 into which the tube 28' projects. The portion of the tube 28' inside of the casing 37 is provided with orifices 38 through which the separated steam flows out. The water which is not evaporated flows through the adjacent tube connection 39 into the tank 10 of the indirect boiler. In this tube connection a stop valve 40 is arranged. The separated steam in the separator 36 is fed through a tube 41 to the steam tube 24 coming from the tank 10. In the tube connection 41 a stop valve 42 is arranged, and 43 is another stop valve in the steam conduit 24. The conduit 24 leads to a superheater 45 arranged in the flue G, and the said superheater is connected with another superheater 46 arranged in the flue E of the once-through boiler. The superheated steam flows into the steam branch 47. In the pipe connection 48, 49 between the two superheaters 45, 46 a stop valve 50 is arranged. From the conduit 48 a branch 51 leads to the steam main 47. In the said branch 51 a stop valve 52 is arranged. In the case that both of the boilers are operated the valve 50 is opened and the valve 52 closed. The two valves 40 and 42 are also opened. The steam coming from the separator 36 flows into the conduit 24 and thence together with the steam generated in the tank 10 of the indirectly heated boiler through conduit 24 to the superheater 45. The steam flows then through the superheater 45 to the steam main 47. In the case that the once-through boiler is turned out and only the indirectly heated boiler alone is charged, the valves 40, 42 and 50 are closed. The steam coming from the tank 10 flows then through the superheater 45 to the steam main 47. The superheater 45 is so dimensioned so that it adequately superheats the quantity of steam generated in the indirect generating system alone. In the other case that both of the boilers are charged a larger quantity of steam is generated, and correspondingly also the heating surface of the superheater is enlarged by adding the superheater 46.

The combined boilers with separated furnaces are especially adapted for ships. For normal run of the ship the necessary steam may be generated alone in the indirectly heated boiler. The delicate once-through boiler has only to be added at full speed to generate the necessary increased quantity of steam in the combined boilers.

In Fig. 4 a boiler with water tubes for ships is illustrated. H is the combustion chamber of the once-through boiler and I is a flue communicating with the top portion of chamber H. K is the combustion chamber of the indirectly heated boiler and L is a flue communicating with the top portion thereof.

The combusion chamber K is enclosed by the heated evaporating tubes 60, 61 of the indirectly heated boiler. The tubes extend at the bottom of the combustion chamber K and form in their following portion a vertical closed tube wall 62 separating the two combustion chambers H and K from each other. In this wall all the tubes are heated by radiation from both sides, the said tubes forming in this way an especially effective heating surface. Moreover this construction offers the advantage of small weight and small space, because in this place special separating walls are not necessary. The two flues I, L are separated from each other by a wall 63 consisting for instance of a heat-proof sheet metal. The upper ends of the tubes 60 extend transversely above the combustion chamber K and are stretched apart, so that the combustion gases may flow through them into flue L. In the flue L a superheater 64 and an economizing coil 65 are arranged in superimposed relation. The other elements correspond with those of the construction of the indirectly heated boiler according to Figs. 1 and 2, so that the respective elements must not be specified.

The evaporating tubes 66 of the once-through boiler form in the chamber H, radiating heating surfaces at the bottom and side wall of the combustion chamber H. In the upper portion of chamber H the tubes form contact heated coils 67, and finally the tubes are connected by means of a tube 68 with the tank 10 of the indirectly heated boiler. In the tube 68 a steam and water separator 36 is provided before the tank. The combustion gases flow over coils 67 in passing from the combustion chamber H into the flue 7, in which a superheater 70 and a coil 71 are arranged.

The fresh water is fed by a pump 27 into the conduit 72 which belongs to the economizing coil 71. In the said conduit a stop valve 73 is arranged. From the coil 71 a conduit 74 leads to the economizing coil 65, and the last-mentioned conduit is provided with a stop valve 75. Between the conduits 72, 74 a duct 76 with a stop valve 77 is provided for bypassing preheater coil 71. The conduit 78 coming from the coil 65 forms branches 79 and 80, the branch 79 leading to the tank 10 of the indirectly heated boiler and the branch 80 leading to water chamber 81 of the once-through boiler. The conduit 79 is provided with a stop valve 82 and the conduit 80 with a stop valve 83.

From the separator 36 of the once-through boiler a steam conduit 87 having a stop valve 86 leads to the superheater 70. From the steam space of the tank 10 of the indirectly heated boiler a steam conduit 88 having a stop 89 leads to the superheater 64.

In the case that the indirectly heated boiler and the once-through boiler are simultaneously charged, the mentioned valves are all opened with exception of the valve 77. The fresh water then flows through the duct 72, the economizing coil 71, the duct 74 the economizing coil 65, the ducts 78 and 80 to the water header 81 of the once-through boiler. In the case that the valve 82 is also opened a part of the fresh water flows from the duct 78 through the duct 79 into the tank 10 which under these circumstances receives beside the remaining unevaporated water of the once-through boiler also additional fresh water. The steam generated in the once-through boiler and separated in the separator 36 flows through the duct 87 to the superheater 70. The steam generated in the tank 10 of the indirectly heated boiler flows through the duct 88 to the super heater 64.

When charging the indirectly heated boiler alone, the economizing coil 71 and the superheater 70 are disconnected from the system. In this case the valves 73, 75 and 83 in the water feeding conduit and also the valve 86 of the steam conduit are closed, whereas the valves 77 and 82 are open. The fresh water flows from the duct 72 through the duct 76 and the portion of the duct 74 in rear of the stop valve 75 to the coil 65 and thence through the ducts 78, 79 to the tank 10.

The boilers referred to are only embodiments described and illustrated by way of example. The parts of the said boilers and the construction of the parts may also be used for other embodiments in a suitable manner. Numerous modifications may be made without departing from the scope of the invention.

I claim:

1. In combination, an indirect steam generator comprising a primary system of heating tubes connected to a heat exchanger, a secondary system including a tank enclosing said heat exchanger, means for conducting feed water to said tank and means for conducting steam from said tank; a once through steam generator including heating tubes; means for separating and removing steam from the steam and water mixture in said once through generator, and means for conducting the unvaporized residual water from said separating means into said tank for vaporization in said secondary system.

2. In the combination of claim 1, a combustion chamber, and said primary system of heating tubes and said heating tubes of said once through generator being located in said chamber.

3. In the combination of claim 1, a first combustion chamber for said primary system of heating tubes, and a second combustion chamber for said heating tubes of said once through generator.

4. In the combination of claim 1, a first combustion chamber for, and having one wall formed by, the heating tubes of said primary system, and a second combustion chamber for the once through generator, said wall being common to both combustion chambers.

5. In combination, an indirect steam generator comprising a first combustion chamber, a primary system of heating tubes in said first chamber and joined to a heat exchanger, a secondary system including a tank enclosing said heat exchanger, means for conducting feed water to said tank and means for conducting steam from said tank; a second combustion chamber, a once through steam generator having heating tubes in said second combustion chamber; and means for conducting the residual unevaporated water, at least, from said once through boiler to said tank for evaporation in said secondary system.

6. In the combination of claim 5, at least a portion of the heating tubes of said primary system constituting a combustion chamber wall common to said first and said second combustion chambers.

7. In the combination of claim 5, separate economizers, one heated by said indirect generator combustion chamber and the other heated by said once through generator combustion chamber, means for connecting said economizers in series, and means for conducting water from said economizers to the heating tubes of said once through generator.

GEORG FRIEDRICH STIEGER.